No. 756,965. PATENTED APR. 12, 1904.
A. JOHNSTON.
MACHINE FOR MANUFACTURING BALLS FROM SHEET METAL.
APPLICATION FILED DEC. 15, 1902.
NO MODEL. 5 SHEETS—SHEET 1.

Witnesses:
Wm. Geiger
S. W. Munday

Inventor:
Allen Johnston
By Munday, Evarts & Adcock.
Attorneys

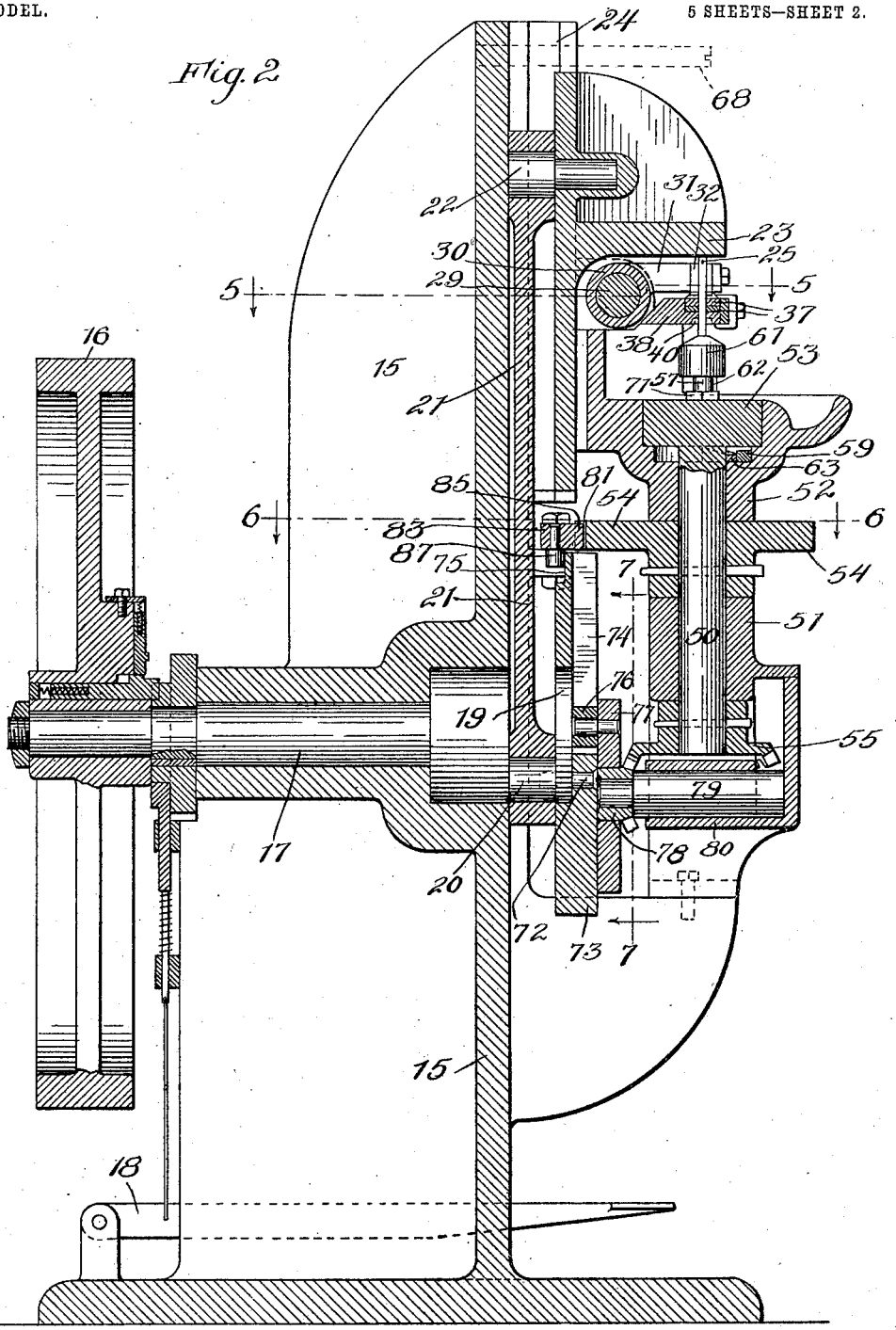

No. 756,965. PATENTED APR. 12, 1904.
A. JOHNSTON.
MACHINE FOR MANUFACTURING BALLS FROM SHEET METAL.
APPLICATION FILED DEC. 15, 1902.
NO MODEL. 5 SHEETS—SHEET 3.
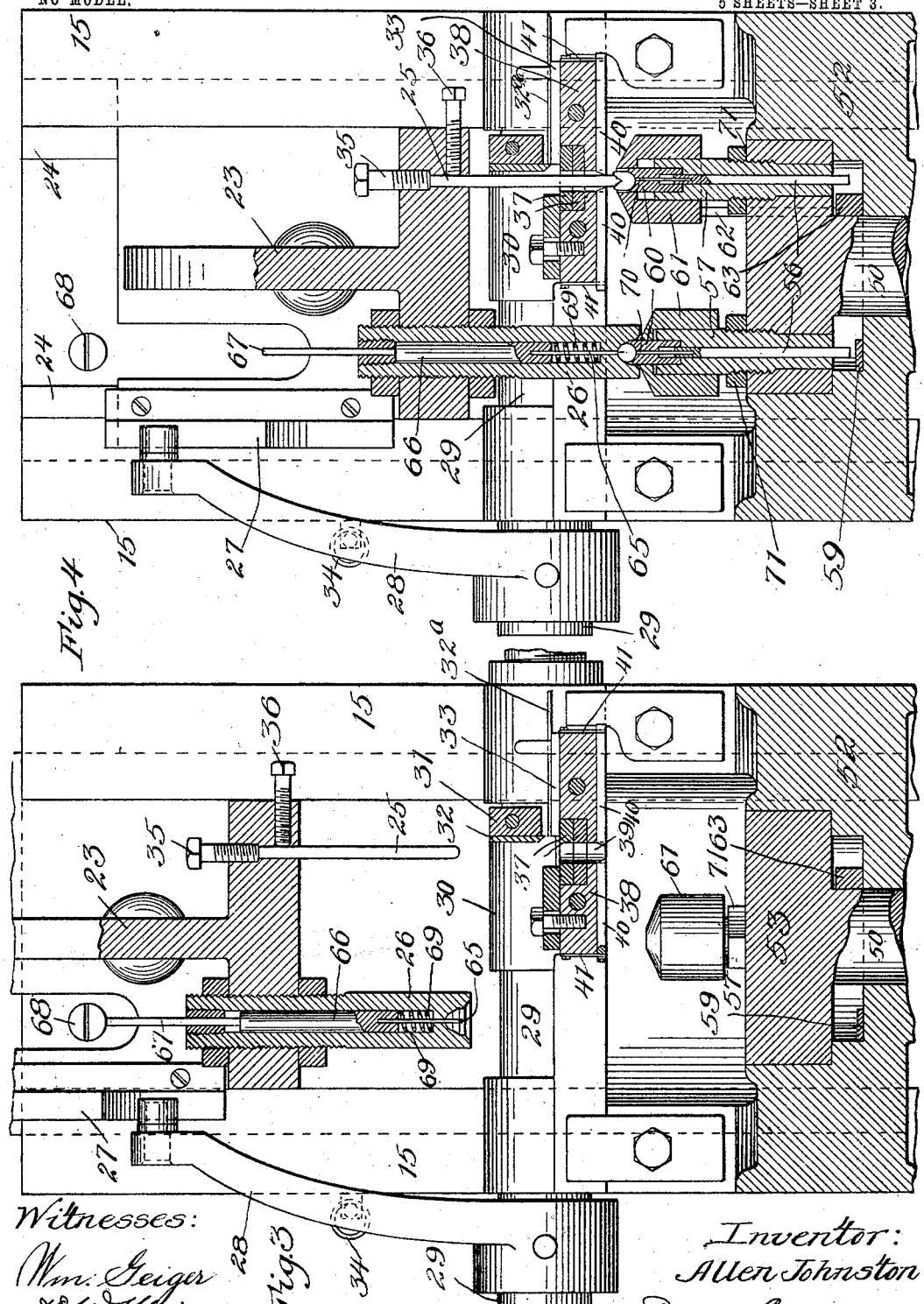

No. 756,965. PATENTED APR. 12, 1904.
A. JOHNSTON.
MACHINE FOR MANUFACTURING BALLS FROM SHEET METAL.
APPLICATION FILED DEC. 15, 1902.
NO MODEL. 5 SHEETS—SHEET 4.

Witnesses:
Wm. Geiger

Inventor:
Allen Johnston
By Munday, Evarts & Adcock.
Attorneys

No. 756,965. PATENTED APR. 12, 1904.
A. JOHNSTON.
MACHINE FOR MANUFACTURING BALLS FROM SHEET METAL.
APPLICATION FILED DEC. 15, 1902.
NO MODEL. 5 SHEETS—SHEET 5.
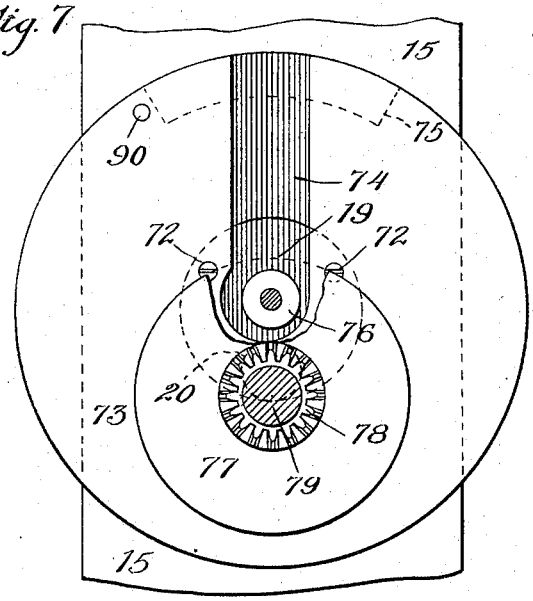
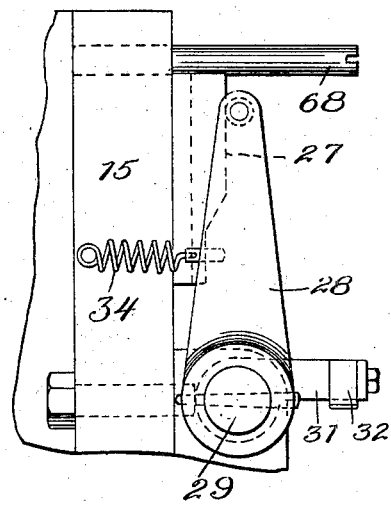
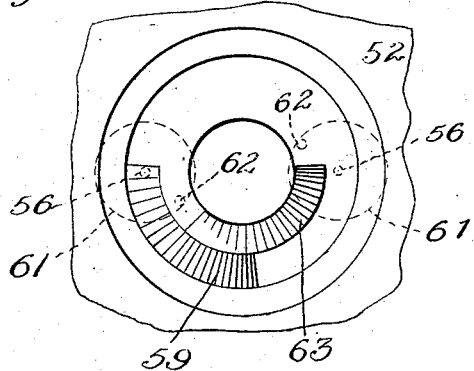
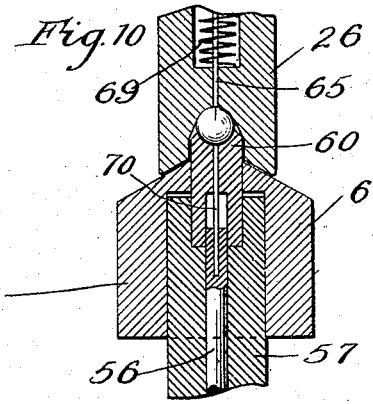
Witnesses:
Wm. Geiger
H. M. Munday
Inventor:
Allen Johnston
By Munday, Evarts & Adcock.
Attorneys No. 756,965. Patented April 12, 1904.

UNITED STATES PATENT OFFICE.

ALLEN JOHNSTON, OF OTTUMWA, IOWA.

MACHINE FOR MANUFACTURING BALLS FROM SHEET METAL.

SPECIFICATION forming part of Letters Patent No. 756,965, dated April 12, 1904.

Application filed December 15, 1902. Serial No. 135,285. (No model.)

*To all whom it may concern:*

Be it known that I, ALLEN JOHNSTON, a citizen of the United States, residing at Ottumwa, in the county of Wapello and State of Iowa, have invented a new and useful Improvement in Machines for Manufacturing Balls from Sheet Metal, of which the following is a specification.

This invention relates to machines for forming balls from sheet metal, and is adapted to bend the metal from the flat into spherical form, the finishing operation set forth in my Patents Nos. 698,707 and 709,409 being performed by the means therein set forth or by other appropriate mechanism.

In the manufacture of sheet-metal balls as heretofore conducted by me the blank is first cut from the flat strip or sheet and then is subjected to the action of a punch and die, by which it is formed into a cup shape, and then the cupped blank is acted upon by concave dies, whereby its open side is closed by the bending of its edges over toward each other and until they are substantially in contact, the cupping and the closing being separate operations and performed by independent machines, and the cupped blank being positioned in the closing machine or press by hand. In my present machine I aim to perform both these operations without any intervening handling of the cupped blanks; and the invention consists in the mechanism by which this end is attained and also in the details and novel features hereinafter fully set forth.

Figure 1:
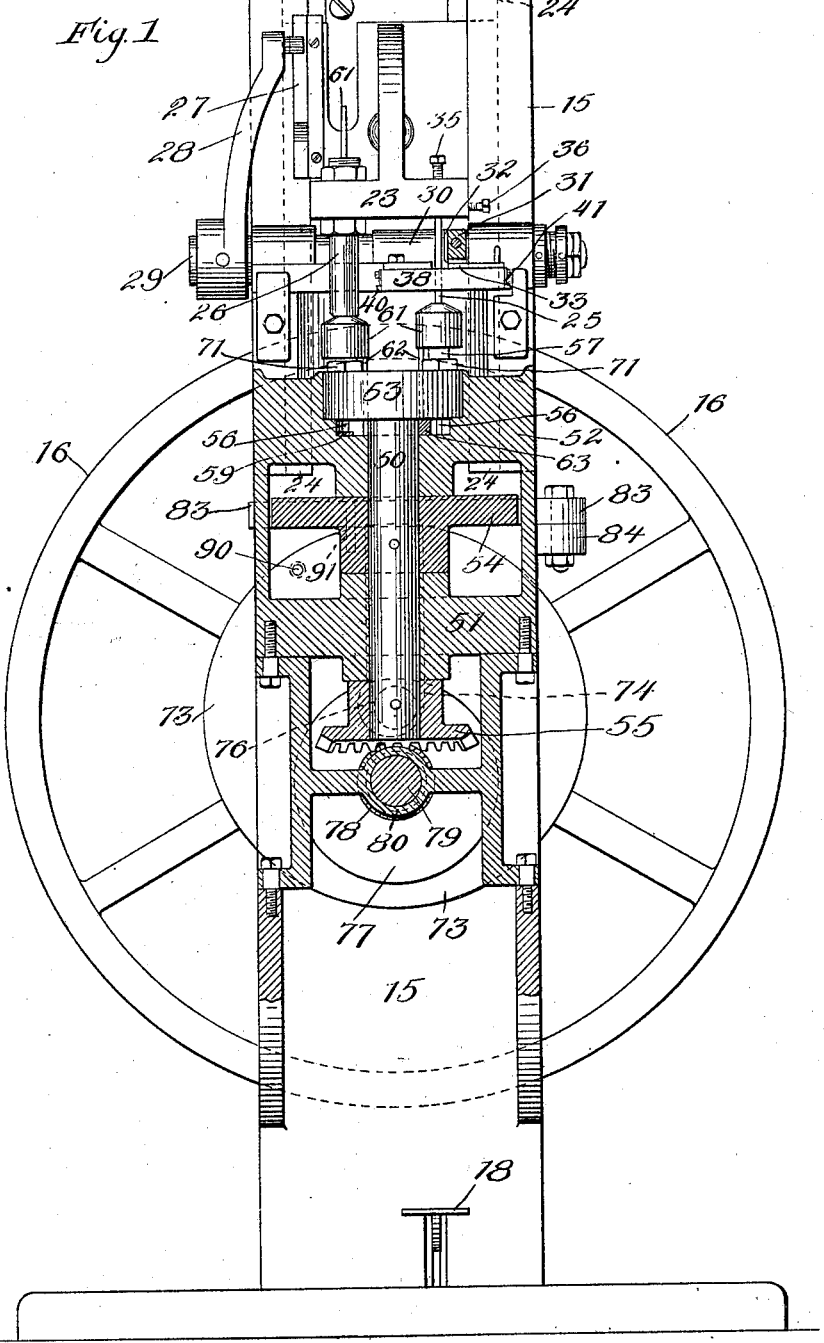
Figure 5:
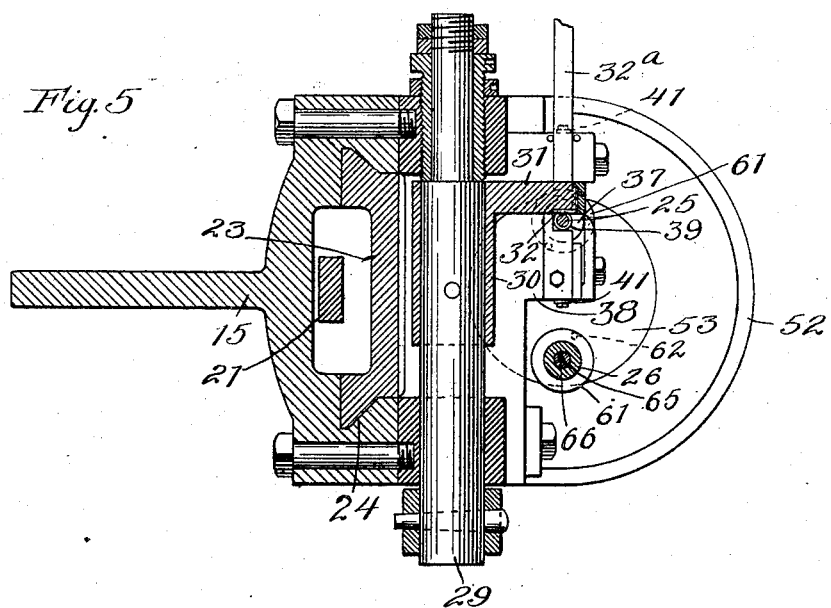
Figure 6:
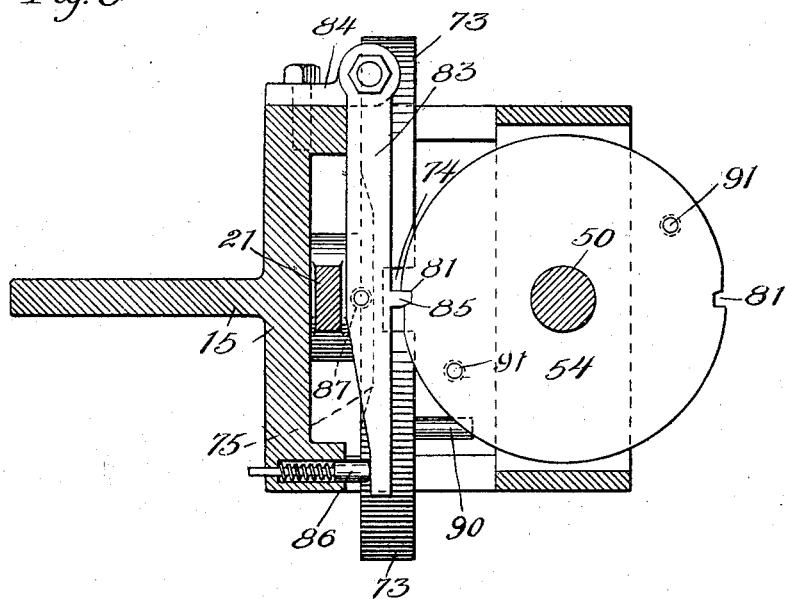

In the accompanying drawings, Figures 1 and 2 are vertical sections of the invention upon planes at right angles to each other. Figs. 3 and 4 are partial vertical sections, showing the operating parts in different positions. Figs. 5, 6, and 7 are sections on the lines 5 5, 6 6, and 7 7, respectively, of Fig. 2. Fig. 8 is a partial side elevation. Fig. 9 is a plan of the cam for throwing out the balls. Fig. 10 is a vertical section of the closing-dies. Figs. 11, 12, and 13 are views showing, first, the flat blank from which the balls are formed; second, the cupped blank, and, third, the closed ball.

In the drawings, 15 represents the frame of the machine, 16 the drive-pulley, and 17 the main shaft on which the pulley is loosely mounted and to which it is adapted to be clutched at will. As any suitable and known form of clutch may be used, I do not deem it necessary to describe the one which is partially shown and which is operated by a treadle 18.

The shaft 17 has a boss 19 on its inner end, a portion of which is cut away, so as to form an eccentrically-located wrist-pin 20. From this pin 20 a pitman 21 extends to a second wrist-pin 22 in a vertically-moving head 23, traveling between the ways 24, formed on the frame. The head 23 carries the punch 25, by which the blank is cupped, and the die 26, by which the open end of the cupped blank is closed. Said head also has formed on it a cam-surface 27, whereby the arm 28 on the end of a rock-shaft 29 may be actuated in one direction at each stroke imparted to the head by the mechanism described. The shaft 29 extends horizontally across the machine and is supported at its ends in stationary bearings, and between the bearings a sleeve 30 is mounted on and keyed fast to the shaft, and this sleeve carries a horizontally-extending arm 31, to which a knife 32 is attached. The strip 32ª, from which the blanks are cut, is fed into the machine at right angles to this knife and is severed by the knife with the assistance of the stationary knife 33 below the strip at each operation of the rock-shaft. A spring 34, attached to the arm 28, is distended when the arm is operated by the cam 27 and serves to return the arm and rock the shaft back to normal position whenever the cam-surface is withdrawn by the head 23 on its downstroke. The punch 25 is adjustable in the head 23, the screw 35 regulating it vertically and the screw 36 locking it.

When the blank, such as that shown at Fig. 11, is severed by the knives, it falls onto a female die located directly below and in alinement with the punch and consisting of one or more perforated steel plates 37, supported in the bracket 38. The opening 39 in plates 37 is extended through the bracket, and below the bracket are stripping-blades 40, impelled toward the opening by springs 41, the acting faces of the blades being beveled, as shown at Figs. 3 and 4, so that they will permit the downward passage of the cupped blank, but resist its return with the punch on the upstroke of the latter. With this construction it will be seen that when the head 23 descends it will force the punch to act on the blank which was severed at the upstroke of the head and which is in position over the die, this action resulting in forming the flat blank into the cup shape shown at Fig. 12.

Below the die is an intermittently-turning vertical shaft 50, supported in bearings 51 and 52, carrying at its upper end oppositely-extending arms 53, at its center a disk 54, and at its lower end a bevel-gear 55. The disk and gear are keyed to the shaft at either side of the bearing 51 and prevent any vertical play by the shaft. Each of the arms 53 supports a cup-shaped die or holder 60, adapted to fit the bottoms of the cupped blanks, and by the turning of the shaft they are brought alternately under the opening of the cupping-die, so that they may receive the cupped blanks therefrom. These holders have no vertical movement of their own; but they are surrounded by vertically-movable cone-topped caps 61, fitting loosely over the standards 57 of the holders, and which standards are threaded into the arms 53. The holders are let into the top of the standards, and the caps when in their elevated positions project beyond the holders and into proximity to the strippers 40, so that the caps act to guide the cup into position in the holder and prevent its escape or loss of position after leaving the cupping-die. The punch 25 descends far enough to insure the entrance of the cupped blank into the holder and the strippers prevent its moving upward with the punch when the latter withdraws. The upward movement of the caps is caused by lifting-rods 62, riding on a cam-surface 63, partially encircling the shaft 50 just below the arms 53 and supported on the part 52, and the downward movement of the caps is due to the pressure of the closing-die. The rods pass downward through the arms 53 and the caps rest upon them without being attached to them. The holder and cap are shown at the right of Fig. 4 in the positions they occupy at the time they receive the freshly-cupped blank from the cupping-die.

After one of the holders has received a blank, as shown at the right of Fig. 4, the head 23 is raised so as to withdraw the punch and also so as to withdraw the closing-die 26, which acts at the same time as the punch. The shaft 50 then receives a half-turn, by which the holder, with the freshly-cupped blank, is transferred from the position shown at the right of Fig. 4 to that shown at the left of the same figure in readiness to be closed into spherical shape by the closing-die, and that operation takes place at the next descent of the head 23. In the meantime another blank will have been cut off and positioned over the die 37 and will be cupped and forced into the other holder 60 at the same operation of the head at which the first-mentioned blank is closed, as just described. It will thus be seen that a completely-formed ball will be turned out at each stroke of the head 23, the holders alternating in receiving the cupped blanks from the cupping devices and in presenting them in position under the closing-die and also coacting with the closing-die in the closing operations, and all this is done without any handling whatever of the blanks.

The closing-die has an ejector 65, secured in a plunger 66, movable in the hollowed core of the die. Normally this ejector is in the position of Fig. 4; but when the die is raised to its elevated position (shown at Fig. 3) a rod 67, projecting upward from the plunger, encounters a stop 68, whereby the plunger is forced down against its lifting-spring 69 sufficiently to force the ejector downward and into the cavity of the die, thereby ejecting the ball if it clings to the die. As soon as the head 23 descends sufficiently to allow it to do so the spring retracts the ejector.

The holders are also provided with ejectors 70 for ejecting the balls. These ejectors are mounted in the upper ends of sliding rods 56, movable in the standards 57, and in the rotary movements of the shaft 50 such rods ride over the cam-surface 59, and are thereby raised after the die has been lifted and the holder has commenced its return to receiving position, the raising movement being sufficient to insure certain ejection. The rods descend by gravity. The standards are locked in position by nuts 71. At the time the closing-die begins to act the caps of the holders are in their highest positions and are pushed down by the descent of the die.

It now remains to describe the mechanism by which continuous motion of the driving-shaft is converted into an intermittent motion for the shaft carrying the holders. Attached to the boss 19 of the drive-shaft by screws 72 is a disk 73, said disk thus moving continuously with the shaft. In one side of this disk near the center is formed a slot 74 and on the other side is an offset 75, extending inward from the periphery and having inclined ends, as seen in dotted lines at Fig. 6. In the slot, which is preferably extended radially to the periphery, is located a roller 76, attached to a disk or arm 77, secured on the hub of a bevel-pinion 78 on the shaft 79, supported in the box 80, said pinion meshing with the gear 55, already mentioned. The roller transmits motion from the disk 73 to disk 77, but does not fill the slot, and leaves room for lost motion, so that there will be intervals of time while the roller is not bearing against the wall of the slot when the disk 77 will not be actuated, thereby rendering the motion of shaft 50 intermittent. I also provide means whereby the movement of the roller 76 may be hastened sufficiently at proper times to carry it from the driving side of slot 74 to the other or non-driving side thereof, and thus allow said roller while the driving side is catching up with it a period of rest, during which the holder-shaft may be locked and the cupping and closing operations performed. These means consist of the pin 90, projecting laterally from disk 73, and the two pins 91, depending from diametrically opposite points of the wheel 54, said pins being arranged so that they come in contact, and as the disk moves faster than the wheel it is enabled to quicken the movement of the latter to the necessary extent to shift the roller 76, as stated. The pin 91 is in contact only momentarily with each pin 91, and as soon as their contact ends the wheel will be locked, as described in the next paragraph.

In order to lock the shaft 50 during its periods of rest, I provide upon the wheel 54 already mentioned notches 81 at diametrically opposite points in its periphery, and a lever 83, hinged at one end to a stationary pin 84 and having a projection 85, adapted to enter said notches, the lever being normally pressed toward the wheel by the spring-slide 86. The lever also carries a roller 87, which rides on the periphery of the disk 73 and is forced into the offset by the spring-slide. Through this roller and the disk the engagement of the projection 85 with the notches of wheel 54 is regulated, the offset allowing the engagement to take place and also causing disengagement, and the unbroken portion of the disk's periphery holding the lever away, so that no engagement can take place while the roller is riding thereon.

It will further be noted that shaft 79 is not in line with shaft 19, but is set below the latter. The object of this arrangement is to render the motion given shaft 79 and the parts actuated by it a variable one, starting slowly and increasing in speed until a half-revolution has been completed and then diminishing gradually until the revolution is completed. This variable speed is due to the changes in position of the roller 76, which in the position shown at Fig. 2 is nearly in line with the axis of shaft 19, but by the time the shaft 79 has made a half-revolution the roller will have moved some considerable distance outward in the slot 74, and consequently the speed of shaft 79 will at one time in its revolution exceed that of shaft 19. By reason of this variable speed of the shaft 79 I am able to run the machine much faster than would otherwise be possible, because the intermittently-moving parts start and stop slowly and avoid all shocks and jars. The gear 55 is twice the size of pinion 78, so that shaft 50 moves at half the speed of shaft 79, and each complete revolution of the latter only carries shaft 50 half-way round, and consequently the slow starts and stops above referred to occur at the right times in the movements of the holders.

While I have shown the machine to be equipped with two holders for the cupped blanks which are positioned alternately in position to receive the blanks, it will be understood that a single holder may be used and still accomplish the main object of the invention.

I have described the holders 60 as being mounted on arms 53; but in practice the arms may be in one piece with the shaft 50, and the term "arms" may also include the diametrically opposite portions of a circular head formed on or applied to said shaft.

I claim—

1. In a machine for forming hollow balls, a punch and die for drawing the flat blank into cup shape, means for removing the blank from the punch a closing-die carrying its own ejector, and a positioning device whereby the cupped blank is positioned for the operation of the closing-die.

2. In a machine for forming hollow balls, means for drawing the blank into cup shape, means for removing the cup from the punch of the drawing means, a die for closing the cup and carrying its own ejector, and a device receiving the cupped blank from the drawing devices and positioning it for the operation of the closing-die.

3. In a machine for forming hollow balls, means for drawing the blank into cup shape and a die for closing the cupped blank and carrying its own ejector, in combination with a device receiving the cupped blank from the drawing means and supporting it during the operation of the closing-die, and means for ejecting the formed ball from the closing-die.

4. In a machine for forming hollow balls, a punch and die for drawing the flat blank into cup shape, means contacting with the edge or points of the cupped blank and serving to remove it from the punch, and means carrying an ejector for both closing and ejecting the cupped blank, in combination with a holder into which the blank is delivered by the cupping means, and by which it is carried into position to be acted upon by the closing means.

5. In a machine for forming hollow balls, means for forming the blank into cup shape, in combination with a device for holding the cup with its open end uppermost and supporting it in that position while it is being closed, a die for closing the open end and carrying an ejector, and an ejecting device in said die.

6. In a machine for forming hollow balls, the combination of means for cupping the blank, and a holder which is adapted to support the cupped blank during the closing operation and which receives the cupped blank in proper position for that operation, a closing-die for closing the open end of the cupped blank, and an ejector for said closing-die acting on the outer surface of the closed end.

7. The combination in a machine for forming hollow balls, of means for cupping the blank, means acting on the open edge of the blank and serving to detach it from the cupping means, and means for closing the cupped blank, and a holder for supporting the cupped blank while it is being closed, said holder receiving the cupped blank from the cupping means both said closing means and said holder being provided with ejectors, substantially as specified.

8. In a machine for forming hollow balls, the combination with means for severing the blank in rectangular form, of a hollow die upon which the blank is placed when severed, a punch for forcing the blank into the die and into cup form, and stripping devices movable toward the punch for removing the blank.

9. In a machine for forming hollow balls, the combination with means for severing the blank in rectangular form, of a hollow die upon which the blank is placed when severed, a punch for forcing the blank into the die and into cup form, stripping devices movable toward the punch for removing the blank therefrom, and a recessed holder into which the blank is forced by the punch.

10. In a machine for forming hollow balls, the combination with means for cupping the blank and a closing-die carrying an ejector adapted to act on the surface of the closed ball, of a hemispherical die or holder in which the cupped blank is deposited by the cupping means, and means for moving said holder into position for the action of the closing-die.

11. In a machine for forming hollow balls, means for cutting out a rectangular blank of flat metal, a hollow die, a punch for forcing the blank through the hollow die, and forming a cup with upstanding points, a supporting-die to receive the closed end of the cup, a closing-die adapted to fully close said points, and mechanism for operating the cutting means, the punch and the closing-die.

12. In a machine for forming hollow balls, a die through which the blank is forced in the cupping operation, a punch for carrying the blank through the said die, spring-pressed stripping devices movable toward the punch and serving to strip the cupped blank therefrom, a plurality of hemispherical dies or holders, a support for such hemispherical dies, a closing-die adapted to close the points of the blank into hemispherical form and into contact with each other, and means for bringing the hemispherical dies into acting position relative to both the cupping-die and the closing-die.

13. In a machine for forming hollow balls, means for forming an angular blank from flat metal, a hollow die through which the blank is forced, a plurality of hemispherical holders receiving the blank from the hollow die, means for forcing the blank through the hollow die and depositing it in one of the hemispherical dies, movable stripping devices for stripping the blank from said forcing means and a die for closing the point of the blank into hemispherical form and into contact with each other.

14. In a machine for forming hollow balls, means for forming a rectangular blank of flat metal, a hollow die, a movable hemispherical holder, means for forcing the blank through the hollow die and leaving it in said hemispherical holder, and a closing-die coöperating with the hemispherical die in closing the open end of the blank into hemispherical form with the points in contact, and an ejector adapted to act upon the outer surface of the closed blank and to force it from the closing-die.

15. In a machine for forming hollow balls, means for forming a rectangular blank of flat metal, a hollow die, a movable hemispherical holder, means for forcing the blank through the hollow die and leaving it in said hemispherical holder, and means for closing the open end of the blank into hemispherical form with the points in contact, said hemispherical holder and said closing means being both provided with ejectors adapted to act on the surface of the ball.

16. In a machine for forming hollow balls, means for cutting off a rectangular blank of flat metal, a hollow die, a punch for forcing the blank through the hollow die, a movable hemispherical holder, a closing-die adapted to close the open end of the blank and to force the points thereof into close contact, said closing-die carrying its own ejector, and mechanism for operating the cutting means, the punch and the closing-die and for positioning the hemispherical holder.

17. In a machine for forming hollow balls, means for cutting off the blank of flat metal, a hollow die, a punch for forcing the blank through the hollow die, a plurality of hemispherical dies receiving the cupped blanks from the punch, a die for closing the cups and carrying its own ejector, and means for positioning the hemispherical dies alternately under the punch and under the closing-die, substantially as specified.

18. The die for closing the open end of the cupped rectangular blank, adapted to force the points of the blank closely together in hemispherical form and complete the ball, and carrying an ejector adapted to act on the outer surface of the ball and discharge it from the die.

19. The combination with the cupping devices and the closing-die, of the hemispherical holder, the cap surrounding the holder, means for positioning the cap vertically, and means for positioning the holder alternately under the cupping devices and under the dies, both the closing-die and the hemispherical holder having ejecting devices, substantially as specified.

20. The machine for making hollow balls having a movable holder for the cupped blanks, and means actuating such holder intermittently and adapted to start and stop the same slowly, such actuating means embracing a driving-shaft 19 and a driven shaft parallel with, but located eccentrically of the axis of the driving-shaft, and gearing for transmitting motion from the driving to the driven shaft.

21. In a machine for forming hollow balls from sheet metal, a hemispherical lower die adapted to support the cupped blank during the closing operation, an upper hemispherical die for closing the cupped blank, and ejectors for both of said dies adapted to eject the completed ball from either die in which it may stick.

ALLEN JOHNSTON.

Witnesses:
B. FUNK,
THOS. RODGERS.